US005600378A

United States Patent [19]
Wasilewski

[11] Patent Number: 5,600,378
[45] Date of Patent: Feb. 4, 1997

[54] LOGICAL AND COMPOSITE CHANNEL MAPPING IN AN MPEG NETWORK

[75] Inventor: Anthony J. Wasilewski, Alpharetta, Ga.

[73] Assignee: Scientific-Atlanta, Inc., Atlanta, Ga.

[21] Appl. No.: 446,322

[22] Filed: May 22, 1995

[51] Int. Cl.[6] .............................. H04N 7/00; H04N 7/10
[52] U.S. Cl. ........................ 348/468; 348/10; 348/461; 348/423; 348/726; 348/906
[58] Field of Search ..................................... 348/426, 473, 348/478, 461, 468, 906, 726, 734, 731, 7, 10; 955/4.2, 6.2; H04N 7/00, 7/10

[56] References Cited

U.S. PATENT DOCUMENTS

| | | | |
|---|---|---|---|
| 4,009,345 | 2/1977 | Flemming et al. | 179/15 BA |
| 4,009,346 | 2/1977 | Parker et al. | 179/15 AQ |
| 4,218,756 | 8/1980 | Fraser | 364/900 |
| 4,484,217 | 11/1984 | Block et al. | 358/84 |
| 4,742,543 | 5/1988 | Frederiksen | 380/9 |
| 4,787,085 | 11/1988 | Suto et al. | 370/110.1 |
| 4,829,569 | 5/1989 | Seth-Smith et al. | 380/10 |
| 4,866,770 | 9/1989 | Seth-Smith et al. | 380/20 |
| 4,907,220 | 3/1990 | Rau et al. | 370/60 |
| 4,908,859 | 3/1990 | Bennett et al. | 380/10 |
| 5,003,384 | 3/1991 | Durden et al. | 358/84 |
| 5,091,936 | 2/1992 | Katznelson et al. | 380/19 |
| 5,119,369 | 6/1992 | Tanabe et al. | 370/60 |
| 5,200,823 | 4/1993 | Yoneda et al. | 358/146 |
| 5,212,691 | 5/1993 | Hokari | 370/110.1 |
| 5,280,470 | 1/1994 | Buhrke et al. | 370/13 |
| 5,296,931 | 3/1994 | Na | 348/731 |
| 5,303,233 | 4/1994 | Sugawara | 370/60 |
| 5,311,506 | 5/1994 | Beisel | 370/58.1 |
| 5,313,455 | 5/1994 | Van der Wal et al. | 370/13 |
| 5,359,601 | 10/1994 | Wasilewski et al. | 348/906 |
| 5,418,782 | 5/1995 | Wasilewski | 348/906 |
| 5,515,106 | 5/1996 | Chaney et al. | 348/461 |

FOREIGN PATENT DOCUMENTS 4207766 9/1992 Germany.
2218287 11/1989 United Kingdom.

OTHER PUBLICATIONS

Beddow, D., "The Virtual Channels Subscriber Interface", *Communications Technology* Apr. 1992, pp. 30, 49.

DVB Service Information (SI), specified as ETSI prETS 300 468, European Telecommunications Standards Institute (Draft—Nov., 1994).

(List continued on next page.)

*Primary Examiner*—John K. Peng
*Assistant Examiner*—Jeffrey S. Murrell
*Attorney, Agent, or Firm*—Woodcock, Washburn, Kurtz, Mackiewicz & Norris

[57] ABSTRACT

Two additional structures for addition to the Digital Video Broadcasters (DVB) Service Information (SI) for implementation of the MPEG-2 Systems Standard (ISO/IEC 13818-1 are provided: the Logical Channel Table (LCT) and the Composite Channel Table (CCT). The LCT provides the mapping between a Logical Channel Number (LCN) representing a service and the transport stream/program number on which the service can be found. LCT entries may designate either simple conventional channels or Composite Channels. The LCT contains a Composite Channel Indicator (CCI), which when set to '1', indicates that the selected channel is a composite channel. In this case, the LCT entry gives the home channel of the Composite Channel, which provides the CCT to the decoder so that the tuner can be retuned to the actual program designated in the CCT for current viewing. Each entry in the CCT associates a Composite Channel Number (CCN) with a LCN and represents the "present" definition for the composite channel. A simple LCN is used as a key to the LCT to determine the transport stream ID and program number for the service components in the usual way. As time progresses, the entry for a specific CCN will change; therefore, the CCN is used as a "pointer" to the LCN which is the currently active service for the composite channel. These tables work with conventional MPEG-2 service definitions to decode multi-service transport streams.

10 Claims, 4 Drawing Sheets

OTHER PUBLICATIONS

MPEG–2 Systems Standard (ISO/IEC 13818–1), Draft of 13 Nov., 1994. "Generic Coding of Moving Pictures and Associated Audio: Systems".

Wasilewski, A., "Syntax Proposal for MPEG–2 Transport Stream Program Specific Information", International Organization for Standardization, ISO/IEC JTC1/SC29/WG11 Jul., 1993.

Wasilewski, A., "An MPEG–2 Multi–Program Multiplex Syntax", International Organization for Standardization, ISO/IEC JTC1/SC29/WG11 MPEG 93/173, Jan. 1993.

Wasilewski, A., "Requirements and Method for High–level Multiplexing of MPEG and Other Digital Service Bitstreams with Universal Transport Layer", International Organization for Standardization, ISO/IEC JTC1/SC2/WG11 MPEG 92/754, Nov. 1992.

Scientific Atlanta Viewgraph "How Do Virtual Channels Work?" [no date].

USSN 08/072,911, filed Jun. 7, 1993, Hamilton et al.

USSN 08/160,848, filed Dec. 3, 1993, Woo et al.

Wasilewski, "Syntax Proposal for MPEG–2 Transport Stream Program Specific Information", Jul. 1993, pp. 1–6.

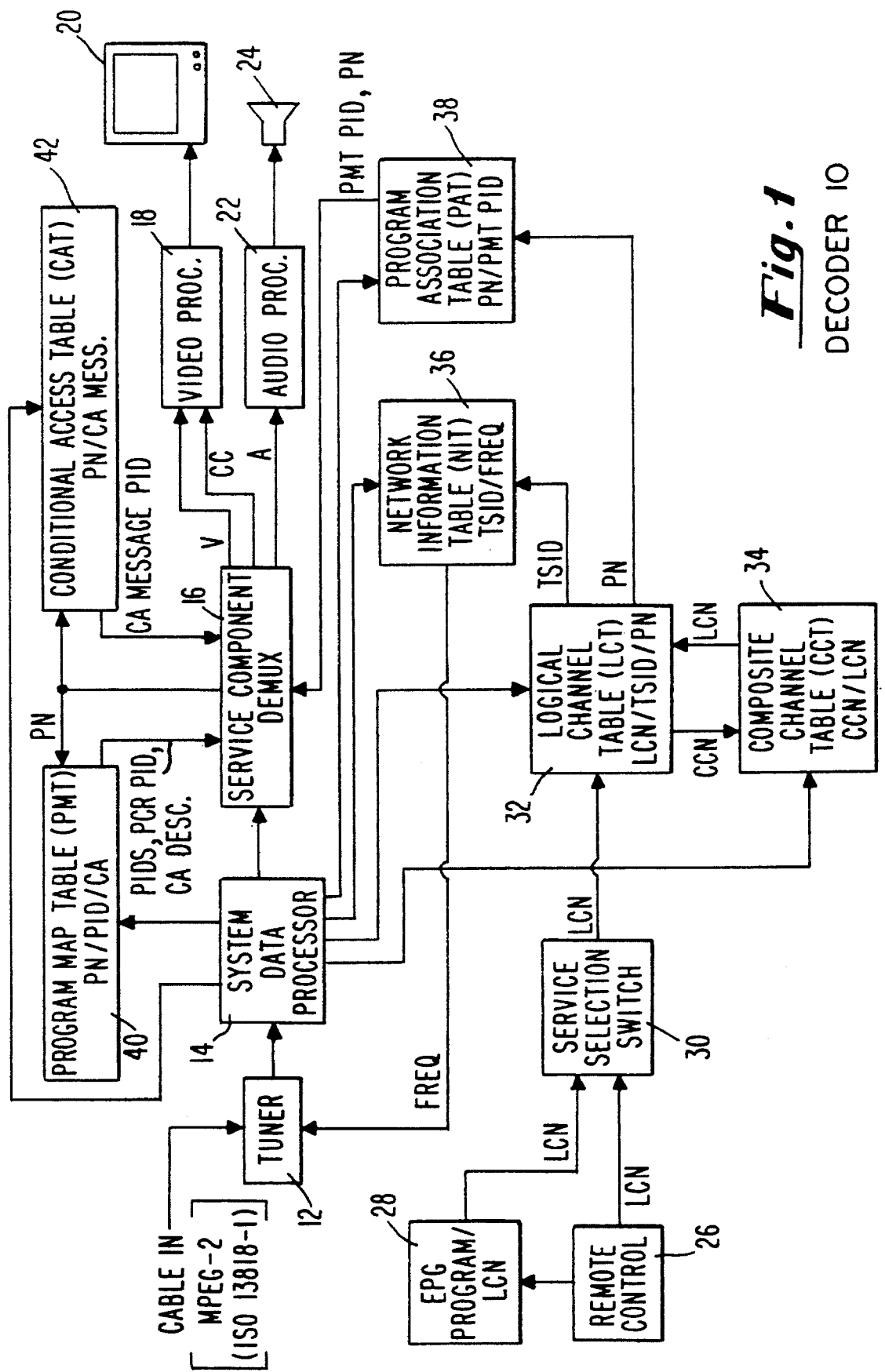
Fig. 1  DECODER 10

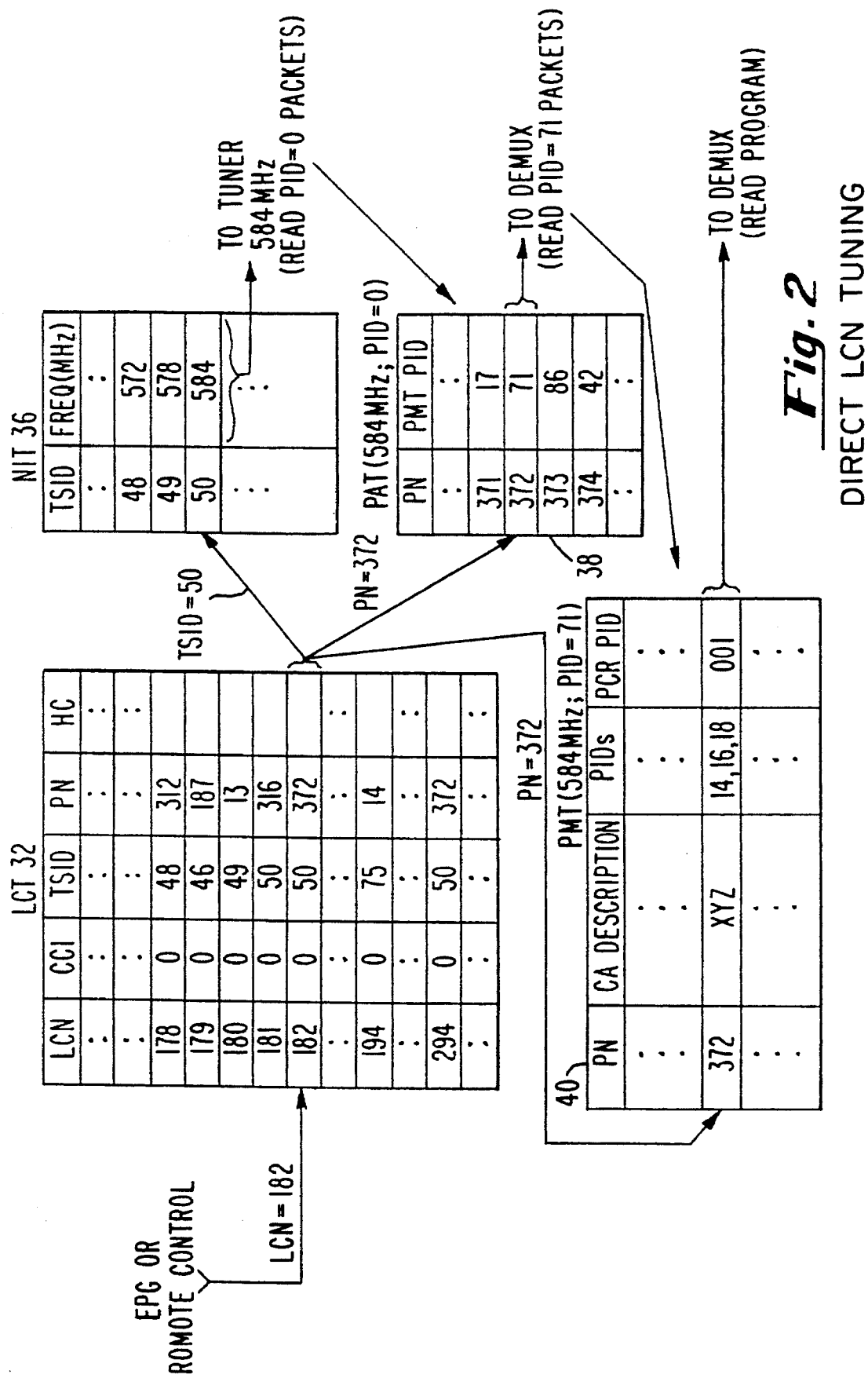
Fig. 2  DIRECT LCN TUNING

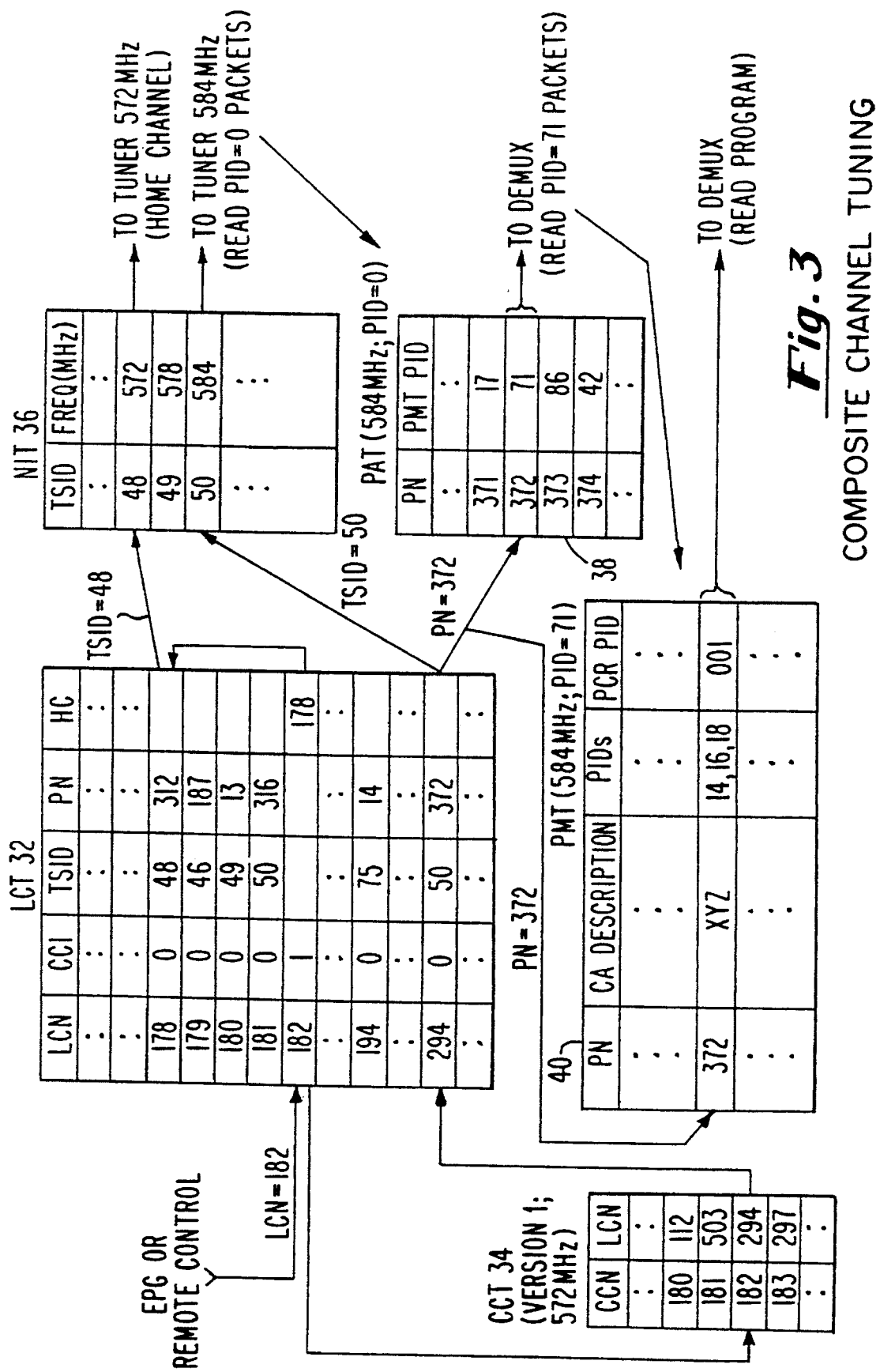
Fig. 3  COMPOSITE CHANNEL TUNING

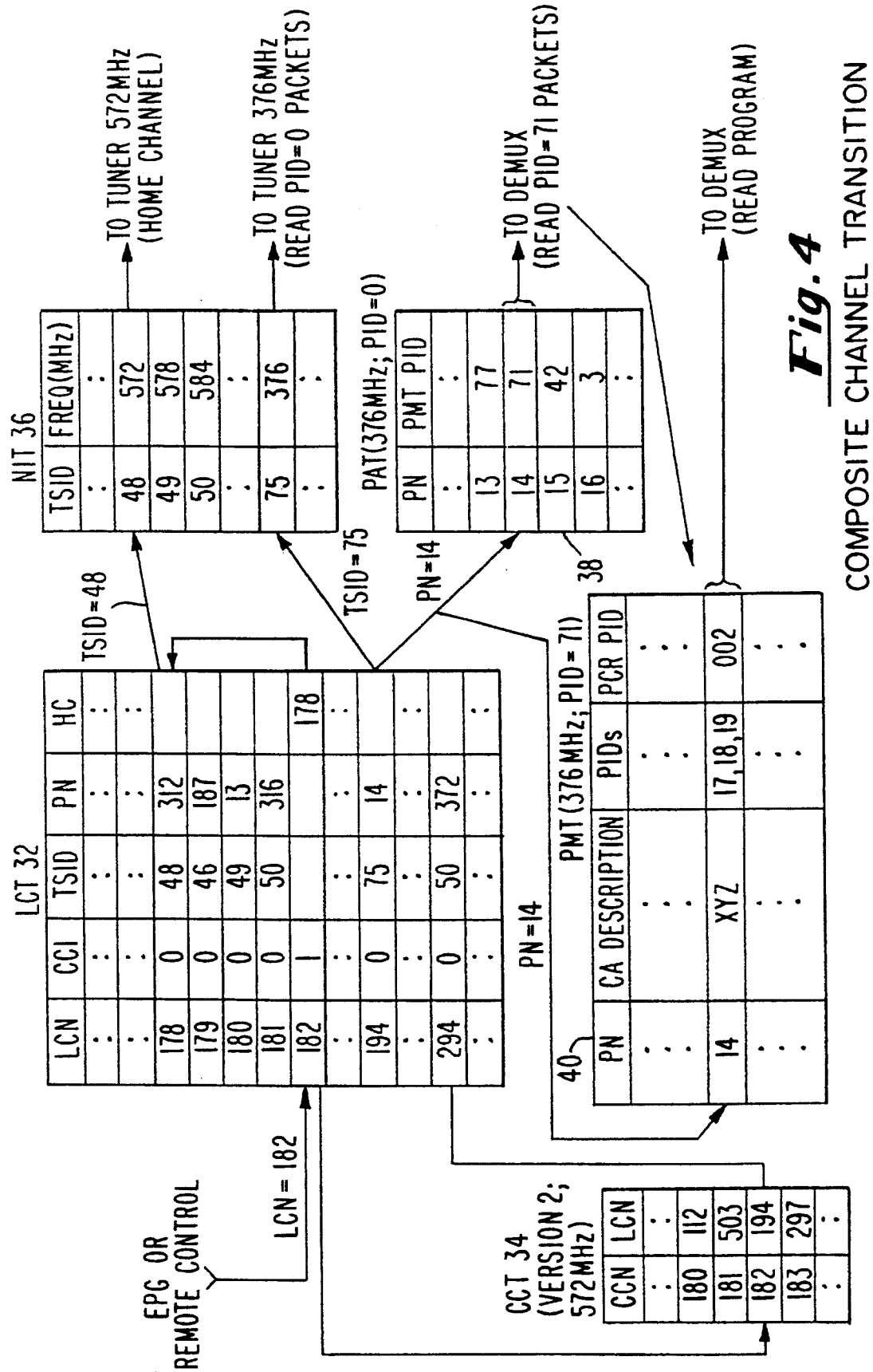
Fig. 4  COMPOSITE CHANNEL TRANSITION

LOGICAL AND COMPOSITE CHANNEL MAPPING IN AN MPEG NETWORK

BACKGROUND OF THE INVENTION

1. Field of the Invention

The present application relates to a multi-service communications system in which a plurality of different services are transmitted to subscribers over one or more different frequency channels. More particularly, the present invention relates to the transmission of a Logical Channel Table (LCT) which provides an abstraction between network parameters, such as transport stream ID and program number, and application layer elements, such as program guides or numeric channel selections, and to the transmission of a Composite Channel Table (CCT) which supports a time-sequenced concatenation of services from possibly different multiplexes so that the concatenation of services appears as a single service requiring no intervention on the part of the subscriber.

2. Description of the Prior Art

In accordance with the MPEG-2 Systems Standard (ISO/IEC 13818-1), one or more programs are combined into a single transport stream for transmission. Data from each elementary stream are multiplexed together with information that allows synchronized presentation of the elementary streams within a program. Generally, a transport stream consists of one or more programs, and the audio and video elementary streams consist of access units. As known to those familiar with the MPEG-2 Systems Standard (ISO/IEC 13818-1), a program is a collection of elementary streams with a common timebase. In other words, a program consists of all the elementary streams which refer to a common Program Clock Reference (PCR) clock. The elementary stream data is carried in Packetized Elementary Stream (PES) packets, where a PES packet consists of a PES packet header followed by packet data. The PES packets are inserted into transport stream packets for transmission. The PES packet header may contain decoding and presentation time stamps (DTS and PTS) as well as other optional fields. Transport stream packets, on the other hand, begin with a 4 byte prefix containing the 13 bit packet ID (PID). The PID identifies, via four Program Specific Information (PSI) tables, the contents of the data contained in the transport stream packet payload.

In the context of the MPEG-2 Systems Standard (ISO/IEC 13818-1) transport stream, acquiring programs requires information from each of the four Program Specific Information (PSI) tables defined by the MPEG-2 Systems Standard (ISO/IEC 13818-1) specification. These tables are the Network Information Table (NIT), the Program Association Table (PAT), the Program Map Table (PMT) and the Conditional Access Table (CAT), and are typically segmented into sections and inserted in transport stream packets. Upon receipt at the decoder, these tables are searched for the desired parameters and need not necessarily be stored locally since they are frequently retransmitted.

The NIT specifies the mapping between transport stream IDs and network physical parameters such as tuning frequencies, transponder numbers, and the like. If an NIT is present, it must be encapsulated in an MPEG-2 private section. The PAT specifies the packet identifiers (PIDs) for the packets which carry Program Map Tables (PMTs) for the components of one or more programs on a transport stream. In other words, the PAT associates a program number with the transport packets that carry the PMT for that program. The PAT is always sent in packets with PID=0. The PMT specifies the PIDs and therefore which elementary streams and descriptors are associated to form each program. The PMT also indicates the PID of the transport stream packets which carry the Program Clock Reference (PCR) for each program, where the PCR is a "snapshot" of the original 27 MHz system time clock of the program. The PMT further indicates stream types, elementary PIDs, program numbers of "virtual channels," conditional access entitlement control messages (ECMs), and the like of packets that make up a particular program. The CAT is used when scrambling is employed and specifies the PIDs of conditional access packets used by decoders to gain entitlements for programs on transport streams. The CAT associates one or more Entitlement Management Message (EMM) and Entitlement Control Message (ECM) streams and other conditional access data with a unique PID and uses a CA descriptor to specify CA linkages and private data. The CAT is always found in PID=1. Several other related structures have been defined by the Digital Video Broadcasters (DVB) group to provide descriptions and access methods for services. These structures and related information are known collectively as the DVB Service Information (SI) and are currently specified as ETSI prETS 300 468 (Draft —November 1994). Further information regarding the above-referenced tables may be found by referring to the MPEG-2 Systems Standard (ISO/IEC 13818-1), the contents of which are hereby incorporated by reference.

In addition to these existing MPEG-2 Systems Standards (ISO/IEC 13818-1) and DVB structures, there are at least two other sources of information that might be used in the tuning process, namely, selections from Electronic Programming Guides (EPG) and direct "channel" selection by the subscriber. As known by those skilled in the art, the EPG is an application that allows subscribers to discover and select their desired programs. The EPG provides the mapping from a human-readable program name, icon, and the like to a specific program as defined, for example, by the MPEG-2 Systems Standard (ISO/IEC 13818-1). The EPG typically needs the subscriber to select a service, which, in turn, identifies the program number and transport stream ID of the selected program. The format and content of typical EPGs are known to those skilled in the art. For example, a description of an EPG assigned to the same assignee as the present invention is given by Hamilton et al. in U.S. patent application Ser. No. 08/072,911, filed Jun. 7, 1993, and entitled "Electronic Program Guide and Text Channel Data Controller." However, in simpler applications, program selections may be accomplished through direct selection of the "channel" number by the subscriber. This could be achieved, for example, via a numeric keypad remote control where the subscriber selects a number which represents a "channel" (or service) and enters that number directly into the set top unit (STU).

To support "channel hopping" by the subscriber, a list of "contiguous" channels must be available. That is, there must exist a way to associate individual channels together as an ordered list so that "up/down", "±" or "increment/decrement" keys will cause the set top unit to tune to the "next" channel in the program listing.

In addition to the access modes described above, it is desirable to support services which are "composites" of other services. That is, a subscriber may subscribe to a service which is composed of, for example, all football games on the network, even though those games are sourced from different individual services such as off-air channels, satellite-distributed sports networks, or digital storage media (for "classic" games, for example). This composite service should be "transparent" so that no intervention for re-tuning is required of the subscriber in order to receive all such programming. A system of this type is described in U.S. Pat. Nos. 5,359,601 and 5,418,782, both also assigned to the same assignee as the present invention.

However, in order to adapt the MPEG-2 Systems Standard (ISO/IEC 13818-1) to accommodate the subscriber selections from an EPG and program selections including composite services, additional structures to those mentioned above for use in MPEG-2 systems are required. This is so because the service provider desires the flexibility of moving programs around to different transport streams and different frequencies without having to update the EPG service provider of each and every change. The present invention has been developed to provide such structures so that the desired functionality can be provided in a manner that is "transparent" to the subscriber as well as to the EPG service provider.

SUMMARY OF THE INVENTION

A system which provides the above-mentioned functionality is described which includes two additional structures for addition to the Digital Video Broadcasters (DVB) Program Specific Information (PSI) and Service Information (SI): the Logical Channel Table (LCT) and the Composite Channel Table (CCT). As described herein, the LCT provides the mapping between a Logical Channel Number (LCN) representing a service and the transport stream/program number on which the service can be found. LCT entries may designate either simple conventional channels or Composite Channels as described herein. Preferably, the LCT contains a Composite Channel Indicator (CCI), which when set to '1', indicates that the selected channel is a composite channel. In this case, the LCT entry gives the home channel of the Composite Channel. Generally, the home channel is a channel for the basic service provided by the Composite Channel. In accordance with the invention, the home channel provides the CCT to the decoder so that the tuner can be retuned to the actual program designated in the CCT for current viewing. In other words, the Composite Channels provide a time-sequenced variable mapping from the LCN to the transport stream ID and program number on that transport stream which contains the current program for the Composite Channel.

The Composite Channels are defined in the Composite Channel Table (CCT). Each entry in the CCT associates a Composite Channel Number (CCN) with a LCN. Each CCT entry represents the "present" definition for the composite channel, and will contain a simple LCN. The simple LCN is used as a key to the LCT to determine the transport stream ID and program number for the service components in the usual way. As time progresses, the entry for a specific CCN will change. That is, a new (simple) LCN will become associated with it. This approach uses the CCN as a "pointer" to the LCN which is the currently active service for the composite channel. Thus, at any one point in time, a specific composite channel may "point" to one, and only one, simple logical channel, which is called the "present logical channel." Thus, a "Composite Channel" as described herein is essentially a dynamic virtual service which is a collection of programs from different conventional (logical) channels. For example, a "composite channel" may be the "Western Channel" which is actually any of a number of actual channels at any given time which contains a program identified as a "western."

As used herein, the logical channels and composite channels apply to only one network. Thus, each network may have its own collection of logical and composite channels. Moreover, it should be noted that the CCT does not provide the same functionality as the Event Information Table (EIT) in the DVB Service Information. The EIT specifies a collection of events which are a time-sequence of the same service. That is, the EIT divides a single service into individual entities called events. On the other hand, the CCT associates portions of different services into a time sequence that appears as a single service from the subscriber's viewpoint. Such distinctions will become apparent to those skilled in the art from the following detailed description of the invention.

BRIEF DESCRIPTION OF THE DRAWINGS

The above and other objects and advantages of the invention will become more apparent and more readily appreciated from the following detailed description of the presently preferred exemplary embodiment of the invention taken in conjunction with the accompanying drawings, of which:

FIG. 1 is a block diagram of an MPEG-2 decoder modified to include a Logical Channel Table and a Composite Channel Table in accordance with the invention.

FIG. 2 illustrates direct logical channel tuning in accordance with the invention.

FIG. 3 illustrates composite channel tuning in accordance with the invention.

FIG. 4 illustrates the transition of a composite channel from one program to another in accordance with the invention.

DETAILED DESCRIPTION OF THE PRESENTLY PREFERRED EMBODIMENT

A preferred embodiment of the invention will now be described with reference to FIGS. 1–4. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

FIG. 1 is a block diagram of an MPEG-2 decoder 10 relating a Logical Channel Table (LCT) and a Composite Channel Table (CCT) with each other and with other MPEG-2 Systems Standard (ISO/IEC 13818-1) physical service information structures. The decoder 10 of FIG. 1 receives via a cable, satellite feed, optical fiber link, and the like, a data stream such as an MPEG-2 Systems Standard (ISO/IEC 13818-1) transport stream of the type described above. In accordance with the invention, the data stream encodes the LCT 1and CCT onto predetermined PIDs of the transport stream, although the PID for the CCT may be determined using a conventional MPEG-2 demultiplexing procedure. The LCT and CCT are then transmitted as part of the transport stream in the conventional manner using a conventional transmission system of the type illustrated in the afore-mentioned U.S. Pat. Nos. 5,359,601 and 5,418,782, the contents of which are hereby incorporated by reference.

In FIG. 1, a tuner 12 is tuned by decoder 10 to the frequency carrying the desired service (program). Optionally, the frequency is determined from a Network Information Table (NIT) 36 (described below) which is stored at the set top unit (STU). The transport stream carried at the selected frequency is provided to system data processor 14, which selects from the transport stream those data packets having PIDs known to contain certain control data. For example, certain PIDs in each transport stream contain the NIT 36, the Program Association Table (PAT) 38, the Program Map Table (PMT) 40 and the Conditional Access Table (CAT) 42. In accordance with the invention, other PIDs in each transport stream may further contain a Logical Channel Table (LCT) 32 and a Composite Channel Table (CCT) 34. Arrows from system data processor 14 to each table in FIG. 1 are intended to illustrate this relationship.

Service component demultiplexer 16 receives the transport stream from system data processor 14 as well as the information from PAT 38, PMT 40, and CAT 42 needed to demultiplex the service components of the selected program from the transport stream. The demultiplexing technique itself is well known to those skilled in the art, while the technique for generating the table parameters in accordance with the invention will be described in more detail below. Upon removal from the transport stream, the video (V) and closed captioned (CC) components are processed by a video processor 18 and presented to video terminal 20 in a conventional manner. Similarly, the audio (A) component is processed by audio processor 22 and presented to speaker(s) 24.

As noted above, the present invention is designed to accommodate Electronic Programming Guide (EPG) service providers by providing a mechanism that allows service providers to freely move programs around to different frequencies and transport streams without having to constantly update the EPG service providers of such changes. In accordance with the invention, this is accomplished by introducing two additional structures for addition to the DVB Service Information (SI): the Logical Channel Table (LCT) 32 and the Composite Channel Table (CCT) 34. The LCT 32 provides the mapping between the Logical Channel Number (LCN) representing a service and the transport stream/program number on which the service can be found. LCT 32 entries may designate either simple conventional channels or Composite Channels. Preferably, the LCT 32 contains a Composite Channel Indicator (CCI), which when set to '1', indicates that the selected channel is a composite channel. In this case, the LCT 32 entry gives the home channel of the Composite Channel. Generally, the home channel is a logical channel that is guaranteed to carry the CCT 34 for the basic service provided by the Composite Channel. In accordance with the invention, the home channel provides the CCT 34 to the decoder 10 so that the tuner 12 can be retuned to the actual program designated in the CCT 34 for current viewing. In other words, the Composite Channels provide a time-sequenced variable mapping from the LCN to the transport stream ID and program number on that transport stream which contains the current program for the Composite Channel.

The Composite Channels are defined in the Composite Channel Table (CCT) 34. Each entry in the CCT 34 associates a Composite Channel Number (CCN) with a LCN. Each CCT 34 entry represents the "present" definition for the composite channel, and will contain a simple LCN. The simple LCN is used as a key to the LCT 32 to determine the transport stream ID and program number for the service components in the usual way. As time progresses, the entry for a specific CCN will change. That is, a new (simple) LCN will become associated with it. This approach uses the CCN as a "pointer" to the LCN which is the currently active service for the composite channel. Thus, at any one point in time, a specific composite channel may "point" to one, and only one, simple logical channel, which is called the "present logical channel." Thus, a "Composite Channel" as described herein is essentially a dynamic virtual service which is a collection of programs from different conventional channels. For example, a "composite channel" may be the "Western Channel" which is actually any of a number of actual channels at any given time which contains a program identified as a "western."

As used herein, the logical channels and composite channels apply to only one network. Thus, each network may have its own collection of logical and composite channels. Moreover, it should be noted that the CCT 34 does not provide the same functionality as the Event Information Table (EIT) in the DVB Service Information. The EIT specifies a collection of events which are a time-sequence of the same service. That is, the EIT divides a single service into individual entities called events. On the other hand, the CCT 34 associates portions of different services into a time sequence that appears as a single service from the subscriber's viewpoint.

During operation, a subscriber either selects a channel directly using his or her remote control unit 26 or selects a program (movie) from EPG 28. In either case, a Logical Channel Number (LCN) defining a service by its transport stream ID (TSID) and program number (PN) is provided to a service selection switch 30. Service selection switch 30 may comprise an infrared transceiver for receiving the LCN from the remote control unit 26 and/or a display device which displays the channel selection to the user on an LED display on the set top unit (STU) containing the decoder 10, on a computer screen, or on the television display itself. Service selection switch 30 provides the LCN to the LCT 32 in accordance with the invention. The LCT 32 is transmitted on a predetermined PID of the transport stream and has the following LCT syntax definition in the syntax of the MPEG-2 Systems Standard (ISO/IEC 13818-1):

Logical Channel Table Syntax Definition

| Syntax | No. of Bits | Mnemonic |
| --- | --- | --- |
| logical_channel_section (){ | | |
|   table_id | 8 | uimsbf |
|   '1' | 1 | bslbf |
|   private_indicator | 1 | bslbf |
|   reserved | 2 | bslbf |
|   private_section_length | 12 | uimsbf |
|   table_id_extension | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   logical_channel_number | 32 | uimsbf |
|   composite_channel_indicator | 1 | bslbf |
|   reserved | 7 | bslbf |
|   if(composite_channel_indicator=='0' { | | |
|     transport_stream_id | 16 | uimsbf |
|     program_number | 16 | uimsbf |
|   } | | |
|   else { | | |
|     home_channel | 32 | uimsbf |
|   } | | |
|   CRC_32 | 32 | rpchof |
| } | | |

The fields in the LCT 32 have similar definitions to those used for the MPEG-2 Systems Standard (ISO/IEC 13818-1). In particular, the following are standard MPEG-2 Systems Standards fields. The table_id is an 8-bit field, the value of which identifies the Private Table this section belongs to. The private_indicator is a 1 bit user definable flag, while the private_section_length is a 12-bit field which specifies the number of remaining bytes in the private section immediately following the private_section_length field. The table_id_extension is a 16-bit field defined by the user, while the version_number is a 5-bit field containing the version_number of the private_section. The version_number is incremented by 1 when a change in the information carried within the private_section occurs. Upon reaching value 31, it wraps around to 0. When the current_next_indicator is set to "0", then the version number is that of the next applicable private_section with the same table_id and section_number. The current_next_indicator is a 1-bit field, which when set to "1" indicates that the private_section sent is currently applicable. When the current_next_indicator is set to "1" then the version_number is that of the currently applicable private_section. When the bit is set to "0", it indicates that the private_section sent is not yet applicable and will be the next private_section with the same section_number and table_id to become valid. The section_number is an 8-bit field which gives the number of the private_section. The section_number of the first section in a private table is 0x00. The section_number is incremented by 1 with each additional section in this private table. The last_section_number is an 8-bit field which specifies the number of the last section (that is, the section with the highest section_number) of the private table of which this section is a part. The CRC_32 is a 32-bit field that contains the CRC value that gives a zero output of the registers in the decoder after processing the entire private section.

In accordance with the invention, additional fields are added to implement the logical channel and composite channel functions of the invention. In particular, the logical_channel_number is a 32-bit field which specifies the number of the logical channel, while the composite_channel _indicator is a 1-bit field, which when set to "1" indicates that the section actually refers to a composite channel. When the composite_channel_indicator is set to "1", the logical channel definition contains a home_channel field. However, when the composite_channel_indicator is set to "0", the section describes a logical channel and contains the logical channel's transport stream ID and program number. The transport_stream_id (TSID) is a 16-bit field which defines the number of the transport stream carrying the logical channel. The TSID is used as a key to the Network Information Table (NIT) 36 to determine the frequency carrying the desired logical channel. The program_number (PN) is a 16-bit field which specifies the program (service) that carries the components of the desired logical channel. The PN is used as a key to the Program Associate Table (PAT) 38 to retrieve the PID on the specified transport stream that carries the Program Map Table (PMT) 40 defining the desired logical channel. Finally, the home_channel is a 32-bit field which defines the logical channel that is guaranteed to carry the Composite Channel Table (CCT) 34 associated with the specified composite channel.

Before accessing a service, a set top unit (STU) cannot determine whether the service is simple or composite. In either case, the STU first reads the LCT 32. If a composite channel has been selected, the corresponding entry in the LCT 32 gives the "home channel" for the composite service. In accordance with the invention, the home channel is just a simple logical channel which carries the Composite Channel Table (CCT) 34 associated with the specified composite channel. The CCT 34 is then also carried in every transport stream in which one of the components of the composite channel are found. Thus, the STU can automatically monitor the CCT 34. As will be described below with respect to FIGS. 3 and 4, when the definition of the selected composite channel in the CCT 34 changes, the decoder 10 can automatically re-tune to the new, "current logical channel", thus acquiring the new service, without any action being taken by the user.

Preferably, the CCT 34 is transmitted as a simple logical channel but may also be transmitted on a predetermined PID of the transport stream of the home channel. In accordance with the invention, CCT 34 has the following CCT syntax definition in the syntax of the MPEG-2 Systems Standard (ISO/IEC 13818-1):

Composite Channel Table Syntax Definition

| Syntax | No. of Bits | Mnemonic |
|---|---|---|
| composite_channel_section() { | | |
| table_id | 8 | uimsbf |
| '1' | 1 | bslbf |
| private_indicator | 1 | bslbf |
| reserved | 2 | bslbf |
| private_section_length | 12 | uimsbf |
| table_id_extension | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| composite_channel_number | 32 | uimsbf |
| logical_channel_number | 32 | uimsbf |
| CRC_32 | 32 | rpchof |

The fields in the CCT have the same definitions as those used above to define the LCT. However, composite_channel_number (CCN) and logical_channel_number (LCN) fields are added. The CCN is a 32-bit field which specifies the number of the composite channel. The decoder 10 will use the LCN field in sections of LCT 32 with the composite_channel_indicator bit set to "1." The LCN, on the other hand, is a 32-bit field which specifies the number of the logical channel associated with the indicated composite channel.

Hence, once the subscriber selects the logical channel, the logical channel number is used as a key to LCT 32. If the logical channel is not a composite channel, the TSID is used as a key to NIT 36 to determine the frequency to which decoder 10 tunes tuner 12. The PAT is extracted from the transport stream at that frequency for PID=0 packets. The PN is used as a key to PAT 38 to extract the PID of the PMT 38. The designated PIDs at the determined frequency are then gathered to obtain the PMT 40. The PN is used as an input to PMT 40 to extract the elementary PIDs of the desired program as well as the PID of the Program Clock Reference (PCR). Finally, if encryption is used, a Conditional Access descriptor is also extracted from the PMT 40.

However, if the selected logical channel is a composite channel, additional steps are necessary. The logical channel number is used to access the LCT 32 as before. This time, the composite_channel_indicator is set to "1." Therefore, the home channel for that LCN is tuned by tuner 12 in order to extract the CCT 34 from predetermined PIDs of the home channel. The LCN is then used as the CCN to the CCT 34. The current LCN is then read from the CCT and used to access the LCT 32. The process then proceeds as before. The channel number in the composite channel is easily transitioned by changing the LCNs in the CCT 34 for the respective CCNs. This may be done without notifying the EPG service provider since the EPG 28 displays only the home LCN for the composite channel, which does not change.

Those skilled in the art will appreciate that it is possible for a single logical channel to be a component of more than one composite channel simultaneously. For example, a single football game could be part of the "All Football Channel" and also part of the "Football Weekend" service. In this case, the composite channels may have the same home channel as well.

Operation of the invention will now be explained with respect to FIGS. 2–4 through examples illustrating the cooperation of the respective tables, including LCT 32 and CCT 34. In each of the following examples, previous entitlement/authorization to the selected service is assumed.

FIG. 2 illustrates an example in which the logical channel number (LCN) is provided directly by the subscriber using the remote control unit 26 or provided by the Electronic Programming Guide (EPG) 28 in response to subscriber selection of the desired movie using the remote control unit 26.

As illustrated in FIG. 2, the EPG 28 or remote control unit 26 provides the decoder 10 with the logical channel number (LCN) of the selected movie (program). In this case, the movie is Heidi, and the LCN is 182. Since logical channel is not a composite channel (CCI=0), the decoder uses LCN 182 as a key for the LCT 32 and retrieves the MPEG Transport Stream ID (TSID) and the program number (PN) for the selected movie. As indicated in LCT 32 in FIG. 2, Heidi is being delivered on transport stream 50, with a PN of 372.

The decoder 10 then uses TSID 50 as a key to look up the frequency of the transport stream in Network Information Table (NIT) 36 which (in, for example, the cable case) is the 6/7/8 MHz slice of bandwidth carrying Heidi. As illustrated in NIT 36 in FIG. 2, TSID 50 is being carried at 584 MHz. The decoder 10 then instructs its tuner 12 to tune to 584 MHz. The decoder 10 then reads PID 0 packets to acquire the Program Association Table (PAT) 38 for transport stream 50. Using PN 372 as a key, the decoder 10 retrieves from PAT 38 the PID on which the Program Map Table (PMT) 40 for the program is transmitted. As shown in FIG. 2, PMT 40 is delivered on PID 71 of transport stream 50.

The decoder 10 then acquires PMT 40 for Heidi by reading packets with PID 71. The decoder 10 then retrieves from the PMT 40 a list of stream types and PIDs for Heidi, the Program Clock Reference (PCR) PID for Heidi, and the Conditional Access (CA) descriptor for each elementary stream in the program. From the CA descriptor, the decoder 10 finds the PIDs of Entitlement Control Messages (ECMs) for use in decoding the transport stream. The decoder 10 now has all the information it requires to demultiplex and descramble the elementary components of Heidi at service component demultiplexer 16.

FIG. 3 illustrates an example in which the subscriber selects Heidi Weekend from the EPG 28 using remote control unit 26. Heidi Weekend is a composite service and has been designated in the LCT 32 as a composite channel by setting CCI=1. In accordance with the invention, it is also defined in CCT 34.

As illustrated in FIG. 3, the EPG 28 provides the decoder 10 with the logical channel number (LCN) of the selected program. In this case, the program is Heidi Weekend, and the LCN is 182. The decoder 10 uses LCN 182 as a key for the LCT 32. Because the Composite Channel Indicator (CCI) is set to "1" for this entry, the decoder 10 determines that Heidi Weekend (LCN 182) is a composite channel. The decoder 10 then tunes to the home channel (HC=178) specified for LCN 182. Because the home channel is itself a logical channel, this is a multi-step operation. As shown in FIG. 3, the home channel for Heidi Weekend has an LCN=178, which is used as a key for LCT 32 for obtaining the transport stream ID. As shown in FIG. 3, LCN 178 has a TSID=48, which is used as a key to the Network Information Table (NIT) 36 to determine that the home channel has a frequency of 572 MHz. Decoder 10 then instructs its tuner 12 to tune to the home channel at 572 MHz.

Once it has acquired the home channel, the decoder 10 reads the Composite Channel Table (CCT) 34 sent on a predetermined PID of the transport stream transmitted at 572 MHz. As illustrated in FIG. 3, the decoder 10 uses LCN 182 as a key for the CCT 34 to determine the present logical channel mapping for Heidi Weekend, in this case, LCN= 294. As noted above, the logical channel mapping of a composite channel varies over time and appears to the subscriber as a single channel even though the contents of numerous actual channels are provided. The status of the CCT 34 is checked by checking the version_number of CCT 34. The decoder 10 then uses LCN 294 as a key for the LCT 32, to retrieve the MPEG Transport Stream ID (TSID) and the program number (PN) for the current movie. The current component in Heidi Weekend is "Heidi Goes To School," which, as shown in FIG. 3, is being delivered on transport stream 50, with a PN of 372.

The decoder 10 uses TSID 50 as a key to look up in the Network Information Table (NIT) 36 the frequency of the transport stream which (for example, in the cable case) is the 6/7/8 MHz slice of bandwidth carrying "Heidi Goes To School." In this case, TSID 50 is being carried on frequency 584 MHz. The decoder 10 then instructs its tuner 12 to tune to 584 MHz. As shown in FIG. 3, the decoder 10 then reads PID 0 packets to acquire the transport stream's Program Association Table (PAT) 38. Using PN 372 as a key, the decoder 10 retrieves from the PAT 38 the PID on which the Program Map Table (PMT) 40 for the program is transmitted. In this case, PMT 40 is delivered on PID 71 of transport stream 50 at 584 MHz.

As shown in FIG. 3, the decoder 10 then acquires the PMT 40 for "Heidi Goes To School" by reading packets with PID 71. The decoder 10 then retrieves from the PMT 40 a list of stream types and PIDs for the program, the Program Clock Reference (PCR) PID for the program, and the Conditional Access (CA) descriptor for each elementary stream in the program. From the CA descriptor, the decoder 10 finds the PIDs of Entitlement Control Messages (ECMs) for use in decoding the transport stream. The decoder 10 now has all the information it requires to demultiplex and descramble the elementary components of "Heidi Goes To School" at service component demultiplexer 16.

At the end of "Heidi Goes To School," the decoder 10 must then tune to the next program in the Heidi Weekend composite channel. Decoder 10 transitions to the next program in a manner invisible to the subscriber by identifying when the version_number of the CCT 34 changes and repeating the following steps of the tuning process.

As shown in FIG. 4, a change in the version_number of the CCT 34 from "1" to "2" causes the decoder 10 to determine that the mapping (which was LCN 294) has changed to LCN 194. The decoder 10 now uses LCN 194 as a key for the LCT 32 to retrieve the MPEG Transport Stream ID (TSID) and the program number (PN) for the selected movie. As illustrated in FIG. 4, the next installment in Heidi Weekend is "Heidi Goes On Holiday," which is being delivered on transport stream 75, with a PN of 14. The decoder 10 then uses TSID 75 as a key to look up in the Network Information Table (NIT) 36 the frequency of the transport stream with TSID 75. As illustrated in FIG. 4, TSID 75 is being carried at 376 MHz. The decoder 10 then instructs its tuner 12 to tune to 376 MHz. The decoder 10 then reads PID 0 packets to acquire the transport stream's Program Association Table (PAT) 38. Using PN 14 as a key, the decoder 10 retrieves from the PAT 38 the PID on which the Program Map Table (PMT) 40 for "Heidi Goes On Holiday" is transmitted. In this case, the PMT 40 is delivered on PID 71.

The decoder 10 then acquires the PMT 40 for "Heidi Goes On Holiday" by reading packets with PID 71. The decoder 10 retrieves from the PMT 40 a list of stream types and PIDs for the program, the PCR PID for the program, and the Conditional Access (CA) descriptor for each elementary stream in the program. From the CA descriptor, the decoder 10 finds the PIDs of Entitlement Control Messages (ECMs) for use in decoding the transport stream. The decoder 10 now has all the information it requires to demultiplex and descramble the elementary components of "Heidi Goes On Holiday" at service component demultiplexer 16.

Those skilled in the art will readily appreciate that many modifications to the invention are possible within the scope of the invention. For example, the techniques described herein are not limited to the provision of video services information or to the MPEG-2 Systems Standard (ISO/IEC 13818-1). Other types of digital information services such as CD-ROM libraries, digital audio, interactive video games (user to user), long distance learning and the like, may be accessed using the packet based digital networking techniques available under the MPEG-2 Systems Standard (ISO/IEC 13818-1) or some other multiplexed data transmission standard in which different services with different program IDs (PIDs) are sent via different channels to different users connected to a digital network adapted to carry compressed video packets, ATM information, and the like. The acquired data may be displayed on a television, broadcast over a stereo system, displayed on a CRT, or presented to the requester in some other known manner. Accordingly, the scope of the invention is not intended to be limited by the preferred embodiment described above but only by the appended claims.

What is claimed:

1. A decoder for extracting service information for a particular data service from a broadband data stream containing a plurality of service transport streams carrying a plurality of data services, comprising:

means for selecting said particular data service from said plurality of data services by specifying a logical channel number;

a tuner which selects a frequency containing service components of said particular data service;

processing means for extracting a logical channel table from said service components, said logical channel table mapping said logical channel number to a particular service transport stream and a program number of said particular service transport stream on which said particular data service can be found; and means for extracting said particular data service from said broadband data stream by specifying said particular service transport stream and said program number corresponding to said logical channel number selected by said selecting means.

2. A decoder as in claim 1, wherein said selecting means comprises a remote control unit which a user uses to enter said logical channel number.

3. A decoder as in claim 1, wherein said selecting means comprises an electronic program guide which maps logical channel numbers to particular data services and a remote control unit which a user uses to select said particular data service from said electronic program guide.

4. A decoder as in claim 1, wherein said processing means uses a transport stream ID of said particular service transport stream corresponding to said logical channel number in said logical channel table as a key to a network information table for determining said frequency tuned by said tuner.

5. A decoder as in claim 4, wherein said processing means uses said program number corresponding to said logical channel number in said logical channel table as a key to a program association table transmitted at said frequency for extracting a key to a program map table for said particular data service.

6. A decoder as in claim 1, wherein said processing means further extracts a composite channel table from said service components, said composite channel table comprising a composite channel number and a current logical channel number, said composite channel number being a time-sequenced variable mapping of a logical channel number specified by said selecting means to said current logical channel number, and said current logical channel number identifying a program currently being transmitted on a channel identified by said selected logical channel number.

7. A decoder as in claim 6, wherein said processing means uses said current logical channel number as a key to said logical channel table to determine a service transport stream ID and a program number of said program currently being transmitted on said channel identified by said selected logical channel number.

8. A decoder as in claim 7, wherein said logical channel table includes means for indicating whether said logical channel number is a time-sequenced variable mapping of said logical channel number specified by said selecting means to said current logical channel number and, if so, for identifying a home channel on which said composite channel table can be found.

9. A decoder as in claim 8, wherein said home channel is used by said processing means as a key to said logical channel table to determine a service transport stream ID of said home channel, and said composite channel table is transmitted at a predetermined location within a service transport stream of said home channel.

10. A decoder as in claim 9, wherein said processing means determines when a logical channel number related to a particular composite channel number has changed to a new logical channel number and said processing means uses said new logical channel number as said key to said logical channel table to determine said service transport stream ID and said program number of said program currently being transmitted on said channel identified by said selected logical channel number.

\* \* \* \* \*